(12) United States Patent
Obata

(10) Patent No.: US 10,802,415 B2
(45) Date of Patent: Oct. 13, 2020

(54) INFORMATION PROCESSING APPARATUS AND IMAGE FORMING APPARATUS WITH IDENTIFICATION OF REFLECTION FACE OF POLYGONAL MIRROR

(71) Applicant: CANON KABUSHIKI KAISHA, Tokyo (JP)

(72) Inventor: Shuji Obata, Noda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/424,119

(22) Filed: May 28, 2019

(65) Prior Publication Data
US 2019/0369519 A1 Dec. 5, 2019

(30) Foreign Application Priority Data
Jun. 4, 2018 (JP) .................................. 2018-106823

(51) Int. Cl.
*G03G 15/043* (2006.01)
*G02B 26/12* (2006.01)
*G03G 15/04* (2006.01)

(52) U.S. Cl.
CPC ........... *G03G 15/043* (2013.01); *G02B 26/12* (2013.01); *G02B 26/127* (2013.01); *G03G 15/04072* (2013.01); *G03G 2215/0404* (2013.01)

(58) Field of Classification Search
CPC ........... G03G 15/043; G03G 15/04072; G03G 2215/0404; G02B 26/12; G02B 26/122; G02B 26/129; G02B 26/127; G02B 26/125
See application file for complete search history.

(56) References Cited

U.S. PATENT DOCUMENTS

| 9,525,795 | B2 | 12/2016 | Sato et al. ......... H04N 1/00891 |
| 9,575,314 | B2 | 2/2017 | Araki .................... G02B 26/124 |
| 10,459,365 | B2 * | 10/2019 | Iikura ................... G02B 26/127 |
| 10,503,093 | B2 * | 12/2019 | Yasuno ................. G03G 15/043 |
| 2017/0285510 | A1 * | 10/2017 | Furuta ................... G03G 15/043 |
| 2019/0308420 | A1 * | 10/2019 | Yamamoto ............. G03G 21/00 |
| 2020/0050128 | A1 * | 2/2020 | Goda ..................... G03G 15/011 |
| 2020/0081368 | A1 * | 3/2020 | Goda ................. G03G 15/0415 |

* cited by examiner

*Primary Examiner* — Walter L Lindsay, Jr.
*Assistant Examiner* — Laura Roth
(74) *Attorney, Agent, or Firm* — Venable LLP

(57) ABSTRACT

An image forming apparatus includes a laser scanner unit, an engine controller, and an image controller. The laser scanner unit includes a polygon mirror configured to reflect a laser beam to scan a photosensitive drum, and a BD sensor configured to detect the laser beam reflected by the polygon mirror to output a BD signal. The engine controller generates an image formation BD signal synchronized with the BD signal. The image controller identifies a reference reflection face based on the number of times of low levels of an image formation BD signal that has been sampled for a predetermined period from a falling edge of the image formation BD signal. The image controller corrects image data based on the identified reflection face to control image formation processing.

8 Claims, 9 Drawing Sheets

INFORMATION PROCESSING APPARATUS AND IMAGE FORMING APPARATUS WITH IDENTIFICATION OF REFLECTION FACE OF POLYGONAL MIRROR

BACKGROUND OF THE INVENTION

Field of the Invention

The present disclosure relates to an information processing apparatus configured to correct image data to transmit the image data to an image forming apparatus, and to an image forming apparatus to which the information processing apparatus is connected.

Description of the Related Art

In an electrophotographic image forming apparatus, a laser beam deflected by a rotating polygon mirror scans a photosensitive member, to thereby form a latent image on the photosensitive member. A shape of a reflection face of the polygon mirror for deflecting the laser beam differs from one reflection face to another. The shape of the reflection face differs from one reflection face to another, and thus a latent image formed on an outer peripheral surface of the photosensitive member by the laser beams deflected by the respective reflection faces is disadvantageously deformed.

In U.S. Pat. No. 9,575,314 B2, there is disclosed a configuration in which an image controller identifies a reflection face of a polygon mirror on which a laser beam is deflected (the image controller performs face identification) based on a time interval between adjacent pulses of an input main-scanning synchronization signal. Specifically, the image controller performs processing involving measuring a time interval between adjacent pulses and identifying a reflection face corresponding to each pulse based on a measurement result. The image controller performs, on the image data, correction corresponding to each reflection face (correction of a writing position of an image, for example). Image formation is performed based on the corrected image data. The face identification is performed before an image of a first page is formed.

In U.S. Pat. No. 9,575,314 B2, when noise is mixed into the input main-scanning synchronization signal, the image controller may not be able to accurately identify a reflection face of the polygon mirror. When a reflection face of the polygon mirror is not accurately identified, appropriate correction corresponding to each reflection face is not performed, and the formed latent image may thus be deformed. The present disclosure has an object to determine a reflection face with high accuracy.

SUMMARY OF THE INVENTION

An information processing apparatus according to the present disclosure, which is connected to an image forming apparatus including an image forming unit, the image forming unit includes: a first receiver configured to receive image data; a light source configured to output light based on the image data received by the first receiver; a photosensitive member; a rotary polygon mirror, which has a plurality of reflection faces, and which is configured to rotate to deflect the light output from the light source through use of the plurality of reflection faces, to thereby scan the photosensitive member; a light receiver configured to receive the light deflected by the rotary polygon mirror; a first identification unit configured to identify a reflection face that is used for scanning of the photosensitive member from among the plurality of reflection faces; and a generator configured to generate a signal including a signal having a first level and a signal having a second level, the generator being configured to generate the signal based on information on the reflection face identified by the first identification unit such that a first length is different from a second length, wherein the first length is a length of a period of the first level corresponding to a specific reflection face from among the plurality of reflection faces and the second length is a length of a period of the first level corresponding to a reflection face other than the specific reflection face, the information processing apparatus comprising: a second receiver configured to receive the signal; a first detector configured to detect a change of a level of the signal received by the second receiver from the second level to the first level; a second detector configured to sample the level of the signal at predetermined time intervals; a determiner configured to determine, based on a sampling result obtained by the second detector during a first period from a first timing, at which the change is detected by the first detector, to a second timing, at which the change is detected first by the first detector after the first timing, whether the change at the first timing is a change corresponding to the specific reflection face; a corrector configured to correct, based on a determination result obtained by the determiner, image data corresponding to a scanning line of the light, through use of correction data corresponding to a reflection face corresponding to the scanning line; and an output unit configured to output the image data corrected by the corrector to the image forming unit.

Further features of the present invention will become apparent from the following description of exemplary embodiments (with reference to the attached drawings.

DESCRIPTION OF THE EMBODIMENTS

In the following, a preferred embodiment of the present disclosure is described with reference to the drawings. However, shapes of components described in this embodiment, and their relative positions and the like are subject to an appropriate change in accordance with a configuration and various conditions of an apparatus to which the present disclosure is applied. Accordingly, it is not intended to limit the scope of the present disclosure only to the following embodiment.

Overall Configuration

Figure 1:
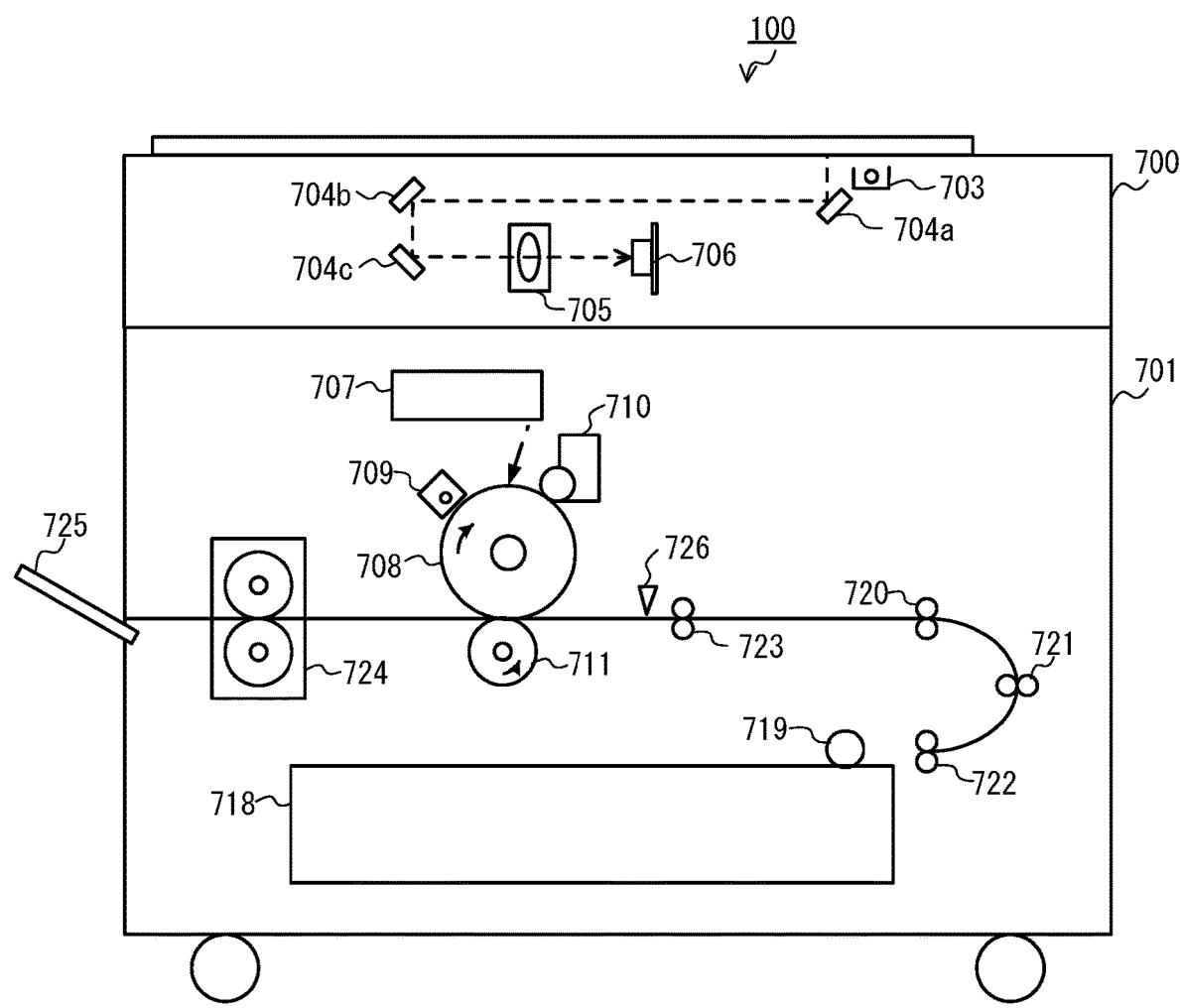
FIG. 1 is a diagram for illustrating a configuration of an image forming apparatus according to one embodiment of the present disclosure.

FIG. 1 is a cross-sectional view for illustrating a configuration of a monochrome electrophotographic copying machine (hereinafter referred to as "image forming apparatus") 100. The image forming apparatus is not limited to a copying machine, and may also be, for example, a facsimile machine, a printing machine, or a printer. Further, the type of image forming apparatus may be any of a monochrome type and a color type.

In the following, the configuration and functions of the image forming apparatus 100 are described. As illustrated in FIG. 1, the image forming apparatus 100 includes an image reading apparatus (hereinafter referred to as "reader") 700 and an image printing apparatus 701.

Light applied by an illumination lamp 703 at a reading position of the reader 700 and reflected from an original is guided to color sensors 706 by an optical system including reflection mirrors 704a, 704b, and 704c and a lens 705. The reader 700 reads the light that has entered the color sensors 706 for each of colors of blue (hereinafter referred to as "B"), green (hereinafter referred to as "G"), and red (hereinafter referred to as "R), and converts the read light into electrical image signals. Further, the reader 700 generates monochrome image data based on B, G, and R image signals, and outputs the image data to an image controller 1007 (see FIG. 3) described later. As described above, in this embodiment, an image of the original is read by the R, G, and B color sensors, and monochrome image data is generated based on reading results. Then, based on the image data, a monochrome image is formed on a recording medium.

A sheet receiving tray 718 is provided in the image printing apparatus 701. Each recording medium received in the sheet receiving 718 is fed by a pickup roller 719, and is sent to registration rollers 723 in a stopped state by conveyance rollers 722, 721, and 720. A leading edge of the recording medium conveyed by the conveyance rollers 720 in a conveyance direction abuts against a nip portion of the registration rollers 723 in the stopped state. When the conveyance rollers 720 further convey the recording medium under the state in which the leading edge of the recording medium abuts against the nip portion of the registration rollers 723 in the stopped state, the recording medium bends. As a result, an elastic force acts on the recording medium, and the leading edge of the recording medium abuts along the nip portion of the registration rollers 723. In the above-mentioned manner, skew feeding of the recording medium is corrected. After skew feeding of the recording medium is corrected, the registration rollers 723 start conveyance of the recording medium at timing described later. The term "recording medium" refers to a medium on which an image is to be formed by the image forming apparatus 100, and examples of the recording medium include a sheet of paper, a resin sheet, a piece of cloth, an OHP sheet, and a label.

The image data obtained by the reader 700 is corrected by the image controller 1007, and input to a laser scanner unit 707 including a laser light source and a polygon mirror. The photosensitive drum 708 has its outer peripheral surface, and the outer peripheral surface is charged with electricity by a charging device 709. After the outer peripheral surface of the photosensitive drum 708 is charged with electricity, the laser scanner unit 707 applies a laser beam based on the image data onto the outer peripheral surface of the photosensitive drum 708. As a result, an electrostatic latent image is formed on a photosensitive layer (photosensitive member) covering the outer peripheral surface of the photosensitive drum 708. A configuration for forming the electrostatic latent image on the photosensitive layer by the laser beam is described later.

Subsequently, the electrostatic latent image is developed by toner contained in a developing device 710, and a toner image is formed on the outer peripheral surface of the photosensitive drum 708. The toner image formed on the photosensitive drum 708 is transferred onto the recording medium by a transfer charging device 711 arranged at a position (transfer position) opposed to the photosensitive drum 708. The registration rollers 723 send the recording medium to the transfer position at such timing as to enable the toner image to be transferred at a predetermined position of the recording medium.

The recording medium on which the toner image has been transferred is fed to a fixing device 724, and is heated and pressurized by the fixing device 724. As a result, the toner image is fixed to the recording medium. The recording medium to which the toner image has been fixed is delivered to a delivery tray 725 provided outside the image forming apparatus 100.

In the above-mentioned manner, the image is formed on the recording medium by the image forming apparatus 100. This concludes the description of the configuration and functions of the image forming apparatus 100.

[Configuration for Forming Electrostatic Latent Image]

Figure 2:
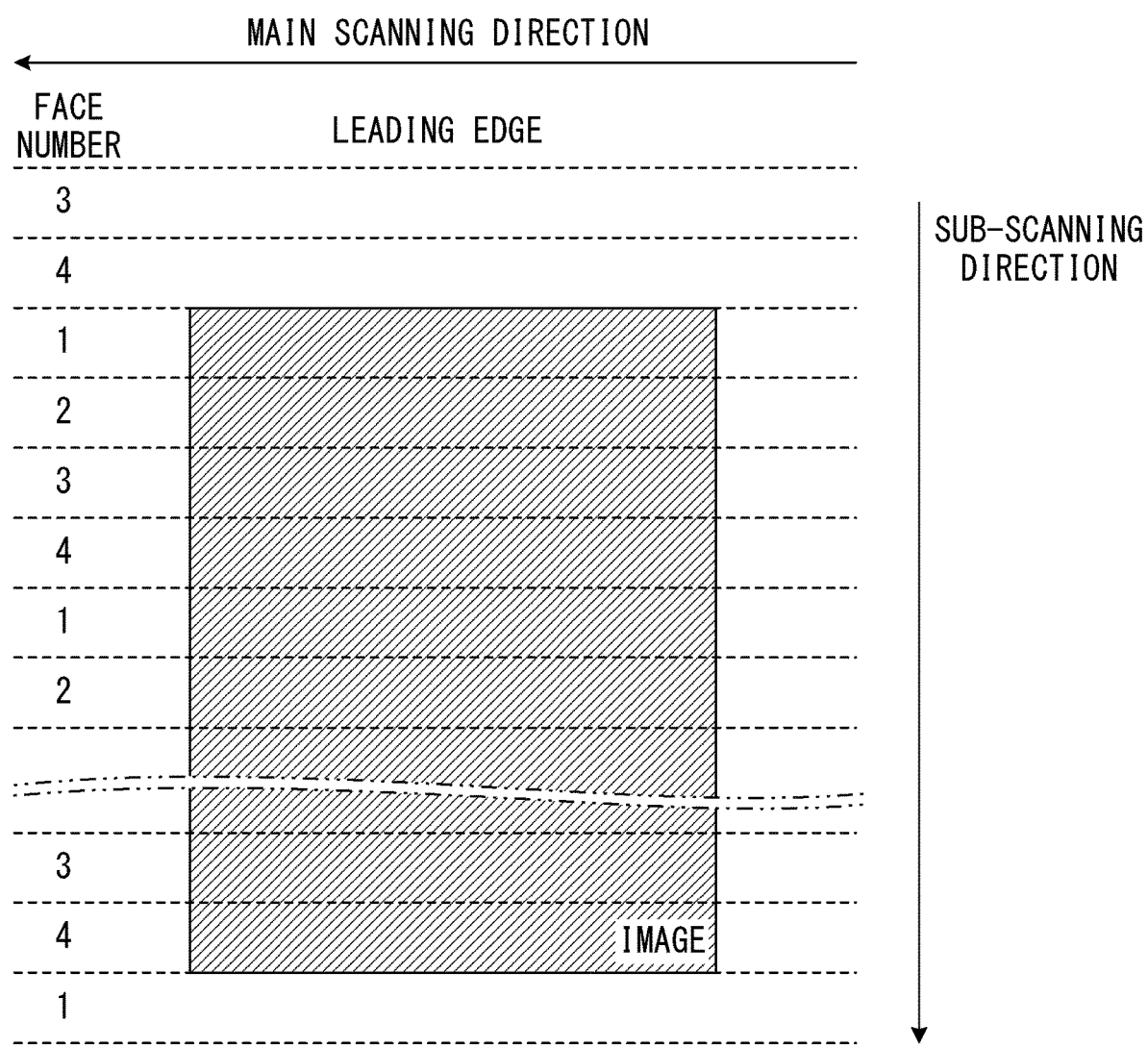
FIG. 2 is a diagram for illustrating an image corresponding to one surface of a recording medium.

FIG. 2 is a diagram for illustrating an image corresponding to one surface of the recording medium. A face number illustrated in FIG. 2 is a number indicating each of a plurality of reflection faces of the polygon mirror described later. In this embodiment, the polygon mirror has four reflection faces. The face numbers are from 1 to 4.

As illustrated in FIG. 2, a laser beam deflected by one reflection face from among the plurality of reflection faces of the polygon mirror scans the photosensitive layer in an axial direction of the photosensitive drum 708 (in a main scanning direction), to thereby form an image (electrostatic latent image) corresponding to a single time of scanning (corresponding to one line) on the photosensitive layer. The electrostatic latent image corresponding to one surface of the recording medium is formed on the photosensitive layer when scanning of the laser beam deflected by each reflection face is repeatedly performed in a direction of rotation of the photosensitive drum 708 (in a sub-scanning direction).

In the following description, data on an image corresponding to the electrostatic latent image corresponding to one line is referred to as "image data".

Laser Scanner Unit

Figure 3:
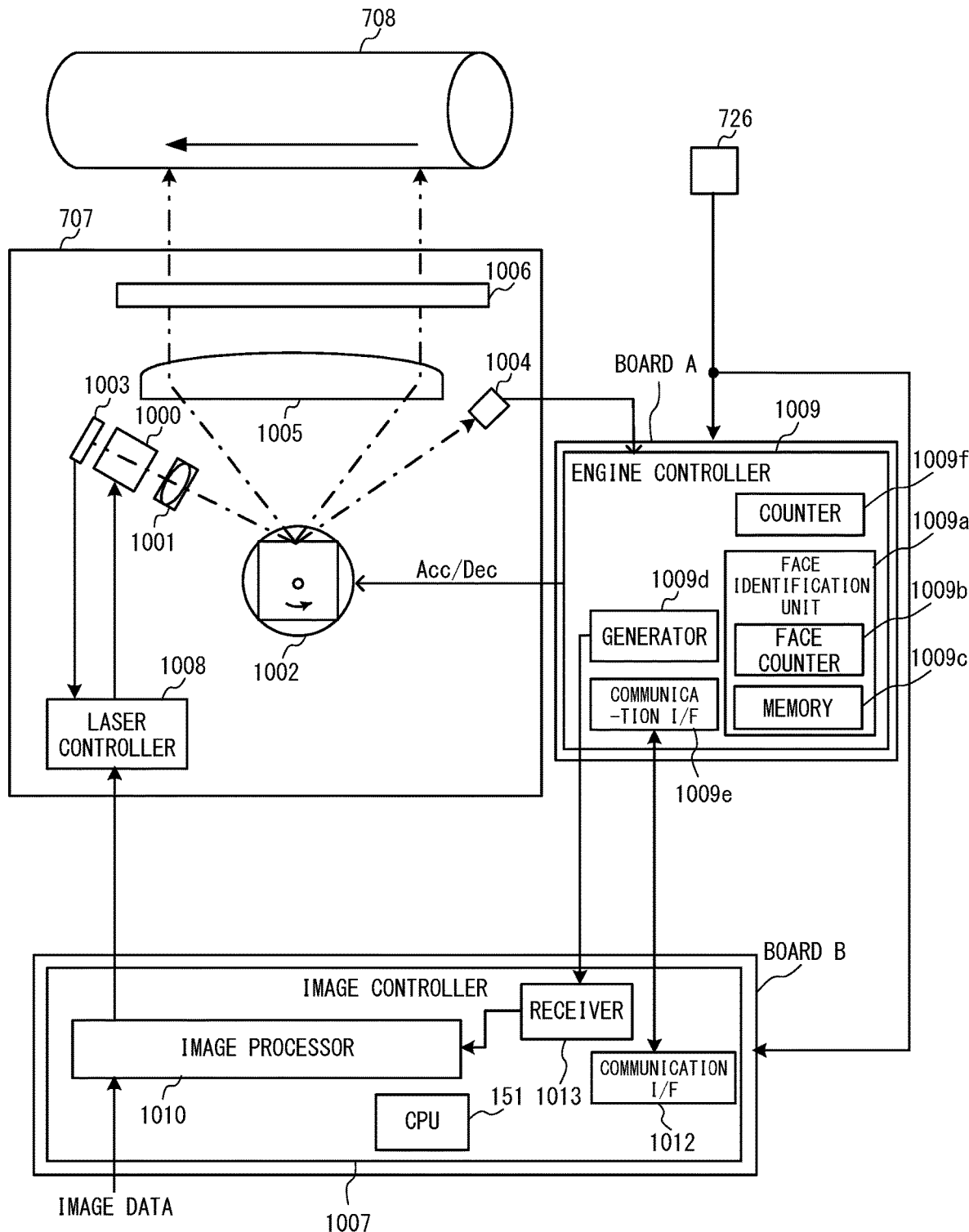
FIG. 3 is a block diagram for illustrating a configuration of a laser scanner unit.

FIG. 3 is a block diagram for illustrating a configuration of the laser scanner unit 707 in this embodiment. In the following, the configuration of the laser scanner unit 707 is described. An engine controller 1009 and the image controller 1007 control the operation of the laser scanner unit 707. The image controller 1007 corresponds to an information processing apparatus according to one embodiment of the present disclosure. In this embodiment, a board A, on which the engine controller 1009 is mounted, is a board different from a board B, on which the image controller 1007 is mounted. The board A, on which the engine controller 1009 is mounted, is connected by a cable to the board B, on which the image controller 1007 is mounted.

The laser scanner unit 707 includes a laser light source 1000, a collimator lens 1001, a polygon mirror 1002, a photodiode (PD) 1003, a beam detection sensor 1004, an F-θ lens 1005, and a reflection mirror 1006. The beam detection sensor is hereinafter referred to as "BD sensor" 1004. The laser scanner unit 707 includes a laser controller 1008 configured to control light emission of the laser light source 1000 in accordance with image data input from the image controller 1007.

The laser light source 1000 emits laser beams in two directions with a light emitting element. The laser beam emitted from the laser light source 1000 in one of the directions enters the photodiode 1003. The photodiode 1003 converts the incident laser beam into an electrical signal, and transmits the electrical signal to the laser controller 1008 as a PD signal. The laser controller 1008 controls, based on the PD signal, an amount of light to be output from the laser light source 1000 (performs auto power control (APC)) such that a light amount of the laser beam becomes a predetermined light amount. In this case, a general APC is performed, and hence a detailed description thereof is omitted.

The laser beam emitted from the laser light source 1000 in the other one direction is applied onto the polygon mirror 1002 serving as a rotary polygon mirror via the collimator lens 1001. The polygon mirror 1002 has a plurality of reflection faces, and is rotationally driven by a polygon motor (not shown). As described above, the polygon mirror 1002 in this embodiment has four reflection faces. The polygon motor rotationally drives the polygon mirror 1002 in accordance with a motor drive signal (Acc/Dec) output from the engine controller 1009.

The laser beam applied to the polygon mirror 1002 is deflected toward a direction of the photosensitive drum 708 by one of the reflection faces. When the polygon mirror 1002 is rotated, a deflection angle of the laser beam changes. Through a change in deflection angle, the laser beam scans the photosensitive drum 708 in one direction. In this embodiment, the laser beam scans the photosensitive drum 708 from the right side to the left side of FIG. 3. The laser beam has its optical path corrected by the F-θ lens 1005 so as to scan the photosensitive drum 708 at a constant speed, and is applied onto the photosensitive drum 708 via the reflection mirror 1006.

The laser beam deflected by the polygon mirror 1002 is received by the BD sensor 1004. The BD sensor 1004 in this embodiment is a detector arranged at a position where the BD sensor 1004 is able to detect a laser beam before the laser beam starts scanning of the photosensitive drum 708. Specifically, for example, as illustrated in FIG. 3, the BD sensor 1004 is arranged in a region that is a part of a region through which the laser beam reflected by the polygon mirror 1002 passes, and that is outside a region in which the laser beam enters the F-θ lens 1005 and is located on an upstream side in the scanning direction of the laser beam (in the main scanning direction).

The BD sensor 1004 generates a BD signal having a first level and a second level based on the detected laser beam, and transmits the BD signal to the engine controller 1009. The BD signal is a detection signal that has, for example, the first level (Low) while the BD sensor 1004 is detecting the laser beam, and the second level (High) while the BD sensor 1004 is not detecting the laser beam. The engine controller 1009 controls the polygon motor based on the obtained BD signal such that a rotation cycle of the polygon mirror 1002 reaches a predetermined cycle. When the cycle of the BD signal has reached the predetermined cycle, the engine controller 1009 determines that the rotation cycle of the polygon mirror 1002 is stable at the predetermined cycle. That is, the engine controller 1009 adjusts the motor drive signal based on the BD signal, to thereby perform feedback control such that the rotation of the polygon mirror 1002 is stable at the predetermined cycle.

The engine controller 1009 transmits to the image controller 1007 an image formation BD signal serving as a synchronization signal for the BD signal. The BD signal and the image formation BD signal are each a signal indicating one scanning cycle at which the laser beam scans the photosensitive drum 708. Further, when the rotation of the polygon mirror 1002 has become stable (when the rotation cycle has reached the predetermined cycle), the engine controller 1009 notifies the image controller 1007 that the rotation of the polygon mirror 1002 has become stable. The image controller 1007 starts face identification processing when obtaining the notification. When the face identification processing is finished, the image controller 1007 notifies the engine controller 1009 that the face identification processing is finished. When obtaining the notification, the engine controller 1009 resumes stopped conveyance of the recording medium by the pair of registration rollers 723.

When a sheet sensor 726 detects the recording medium, the conveyance of which is resumed, the sheet sensor 726 notifies the image controller 1007 of detection of the recording medium. When receiving from the sheet sensor 726 the notification of detection of the recording medium, the image controller 1007 transmits to the laser controller 1008 a laser drive signal for causing the laser light source 1000 to emit a laser beam. The image controller 1007 transmits the laser drive signal to the laser controller 1008 in response to (in synchronization with) the image formation BD signal input from the engine controller 1009. That is, the image controller 1007 uses the image formation BD signal as a timing signal for outputting the laser drive signal. The image controller 1007 generates the laser drive signal based on the image data. The laser controller 1008 controls light emission of the laser light source 1000 in accordance with the laser drive signal. The laser light source 1000 is driven to be turned on and off under the control of the laser controller 1008, to thereby form an electrostatic latent image based on the image data on the photosensitive drum 708.

A distance L from a position at which the recording medium is detected by the sheet sensor 726 to the transfer position is longer than a distance x from a position on the outer peripheral surface of the photosensitive drum 708 at which the laser beam is applied to the transfer position in the rotation direction of the photosensitive drum 708. Specifically, the distance L is a distance obtained by adding the distance x to a distance for which the recording medium is conveyed during a period from when the sheet sensor 726 detects the recording medium until the laser beam is emitted from the laser light source 1000. During the period from when the sheet sensor 726 detects the leading edge of the recording medium until the laser beam is emitted from the laser light source 1000, the image controller 1007 corrects the image data and controls the laser controller 1008, for example.

Face Identification Processing for Identifying Reflection Face of Polygon Mirror The image controller 1007 outputs, in accordance with the cycle of the input image formation BD signal, the corrected image data to the laser controller 1008 in order from the most upstream piece of image data in the sub-scanning direction. The laser controller 1008 controls the laser light source 1000 in accordance with the input image data, to thereby form an image on the outer peripheral surface of the photosensitive drum 708. In this embodiment, the number of reflection faces of the polygon mirror 1002 is four, however, the number is not limited to four.

The image to be formed on the recording medium is formed by the laser beams deflected by the plurality of reflection faces of the polygon mirror 1002. Specifically, for example, as illustrated in FIG. 2, an image corresponding to the most upstream piece of image data in the sub-scanning direction is formed by a laser beam deflected by a first face of the polygon mirror 1002. Further, an image corresponding to the second most piece of upstream image data in the sub-scanning direction is formed by a laser beam deflected by a second face of the polygon mirror 1002, which is different from the first face. In the manner described above, the image formed on the recording medium is formed of images formed by the laser beams reflected in order by the plurality of respective reflection faces of the polygon mirror 1002.

When the polygon mirror 1002 having four reflection faces is used, there is a possibility that an angle formed by adjacent two reflection faces of the polygon mirror 1002 is not accurately 90°. Specifically, there is a possibility that, when the polygon mirror 1002 having four reflection faces is viewed from the direction of its rotation axis, an angle formed by adjacent two sides is not accurately 90° (that is, the shape of the polygon mirror 1002 viewed from the direction of the rotation axis is not a square). When the polygon mirror having n (n is a positive integer) reflection faces is used, there is a possibility that the shape of the polygon mirror viewed from the direction of the rotation axis is not a regular n-gon.

When the angle formed by adjacent two reflection faces of the polygon mirror 1002 having four reflection faces is not accurately 90°, the position and size of the image formed by the laser beam differ from one reflection face to another. As a result, an image formed on the outer peripheral surface of the photosensitive drum 708 is deformed, and thus an image formed on the recording medium is also deformed.

In view of the above, in this embodiment, correction (correction of a writing position of an image, for example) based on a correction amount (correction data) corresponding to each of the plurality of reflection faces is performed on the image data. In this case, a configuration for identifying a reflection face on which the laser beam is deflected is required. In the following, an example of a method of identifying a reflection face on which the laser beam is deflected is described. In this embodiment, a reflection face on which the laser beam is deflected (reflected) from among the plurality of reflection faces is identified by a face identification unit 1009*a* provided in the engine controller 1009.

Figure 4A:
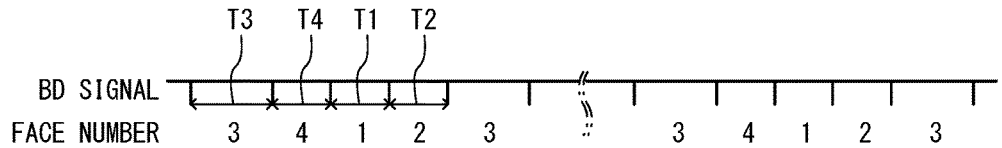
FIG. 4A and FIG. 4B are each a diagram for illustrating an example of a relationship between a BD signal and a face number of a reflection face.

FIG. 4A is a diagram for illustrating an example of a relationship between a BD signal generated by a laser beam scanning a light receiving surface of the BD sensor 1004 and a reflection face on which the laser beam is deflected (face number thereof). As illustrated in FIG. 4A, a time period (scanning cycle) until a BD signal falls first after the BD signal rose subsequently to previous falling of the pulse of the BD signal differs from one reflection face of the polygon mirror 1002 to another. The scanning cycle corresponds to a time period from when the laser beam scans the light receiving surface of the BD sensor 1004 until the laser beam scans the light receiving surface again.

In FIG. 4A, a scanning cycle corresponding to a face number 1 is indicated by T1, a scanning cycle corresponding to a face number 2 is indicated by T2, a scanning cycle corresponding to a face number 3 is indicated by T3, and a scanning cycle corresponding to a face number 4 is indicated by T4. Each of the scanning cycles is stored in a memory 1009*c* provided in the face identification unit 1009*a*.

Figure 4B:
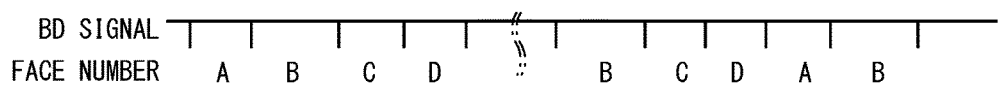

The face identification unit 1009*a* uses the following method to identify a reflection face (face number) on which the laser beam is deflected. Specifically, as illustrated in FIG. 4B, the face identification unit 1009*a* sets face numbers A to D for four successive scanning cycles of the BD signal. Then, the face identification unit 1009*a* measures a scanning cycle for each of the face numbers A to D a predetermined number of times (for example, 32 times), and calculates an average value of the measured cycles for each of the face numbers A to D.

The engine controller 1009 identifies, based on the calculated cycle and the scanning cycles T1 to T4 stored in the memory 1009*c*, which of the face numbers 1 to 4 each of the face numbers A to D corresponds to.

In the manner described above, the face identification unit 1009*a* identifies the number of a reflection face on which the laser beam is deflected (reflection face that is used for scanning of the photosensitive drum 708 from among the plurality of reflection faces of the polygon mirror 1002) based on the input BD signal.

Processing by Engine Controller

Figure 5:
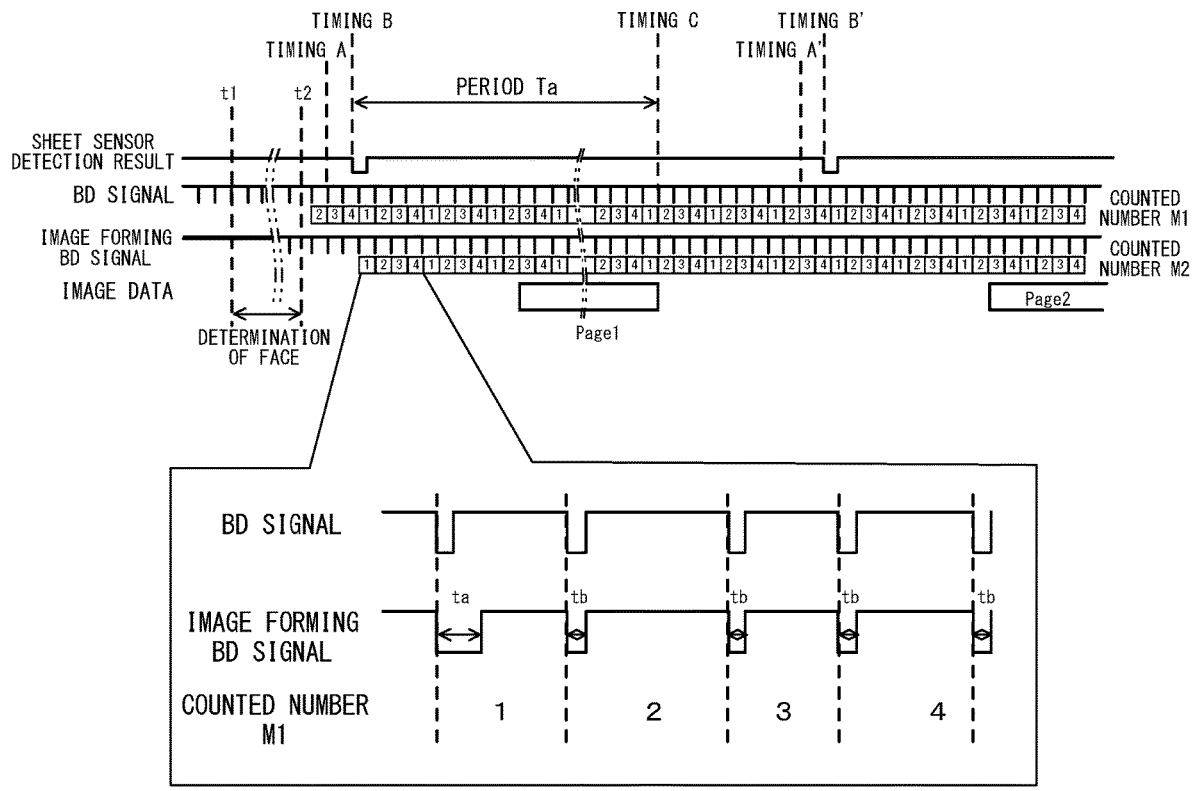
FIG. 5 is a timing chart for illustrating a relationship between various signals and a counted number.

Next, control to be performed by the engine controller 1009 in this embodiment is described with reference to FIG. 3 and FIG. 5. As illustrated in FIG. 3, the face identification unit 1009*a* includes a face counter 1009*b* configured to store face information indicating a reflection face on which the laser beam for scanning the light receiving surface of the BD sensor 1004 is deflected. FIG. 5 is a timing chart for illustrating a relationship between various signals and a counted number M1 of the face counter 1009*b*. The counted number M1 of the face counter 1009*b* corresponds to the face information.

When the rotation cycle of the polygon mirror 1002 has reached the predetermined cycle (time t1), the engine controller 1009 (face identification unit 1009*a*) performs identification of a face number (determination of a face) by the method described above based on the input BD signal.

At a time t2, at which the face identification unit 1009*a* finishes the identification (estimation) of the face number, the engine controller 1009 starts counting by the face counter 1009*b*. Specifically, when the identification of the face number is finished, the engine controller 1009 sets a face number corresponding to a BD signal that is input first after the identification of the face number is finished, as an initial value of the counted number M1 of the face counter 1009*b*. After setting the initial value of the counted number M1, for example, the engine controller 1009 updates the counted number M1 every time a falling edge of the input BD signal is detected. When the polygon mirror 1002 has n (n is a positive integer) reflection faces, M1 is a positive integer satisfying $1 \leq M1 \leq n$.

After that, the engine controller 1009 notifies the image controller 1007 via a communication I/F 1009*e* that the determination of the reflection face is completed. In response to the notification from the engine controller 1009, a central processing unit (CPU) 151 outputs an instruction to execute printing (instruction to form an image on the recording medium) to the engine controller 1009 via the communication I/F 1012 (timing A). In response to the instruction, the engine controller 1009 starts drive of the registration rollers 723. The sheet sensor 726 detects the leading edge of the recording medium (timing B), the conveyance of which is resumed. The timing A is determined by the CPU 151 based on a time period for processing of the printing job input to the image forming apparatus 100. That is, the timing A is not limited to the timing illustrated in FIG. 5. Further, in this embodiment, the detection result illustrated in FIG. 5 reaching the low level corresponds to the sheet sensor 726 detecting the leading edge of the recording medium.

When the determination of the reflection face is completed, a generator 1009d generates an image formation BD signal based on the face information on the reflection face identified by the face identification unit 1009a and the BD signal output from the BD sensor 1004. Specifically, the generator 1009d sets a time period in which an image formation BD signal indicating a specific reflection face (face "1" in this embodiment) is at "L (low level)" to a time period different from a time period in which an image formation BD signal indicating another reflection face is at "L (low level)". More specifically, as illustrated in FIG. 5, the generator 1009d sets a time period in which an image formation BD signal corresponding to the face number "1" is at "L" to a time period different from time periods for the other face numbers "2", "3", and "4". In this embodiment, a time period ta, in which the image formation BD signal corresponding to the face number "1" is at "L", is set to a time period longer than a time period tb, in which the image formation BD signal corresponding to each of the other face numbers "2", "3", and "4" is at "L".

In response to (in synchronization with) the BD signal output from the BD sensor 1004, the engine controller 1009 outputs the signal generated by the generator 1009d as the image formation BD signal.

The engine controller 1009 includes a counter 1009f configured to count the number of pulses of the output image formation BD signal. Further, as illustrated in FIG. 3, a detection result obtained by the sheet sensor 726 is input to the engine controller 1009. The sheet sensor 726 is arranged on a downstream side of the registration rollers 723 in the conveyance direction of the recording medium, and is configured to detect that the leading edge of the recording medium has reached the sheet sensor 726. When a signal indicating detection of the leading edge of the recording medium is input from the sheet sensor 726, the engine controller 1009 uses the counter 1009f to start counting of the number of pulses of the output image formation BD signal. When the counted number of pulses has reached the number of pulses corresponding to one page of the recording medium (period Ta), the engine controller 1009 stops drive of the registration rollers 723.

Figure 6:
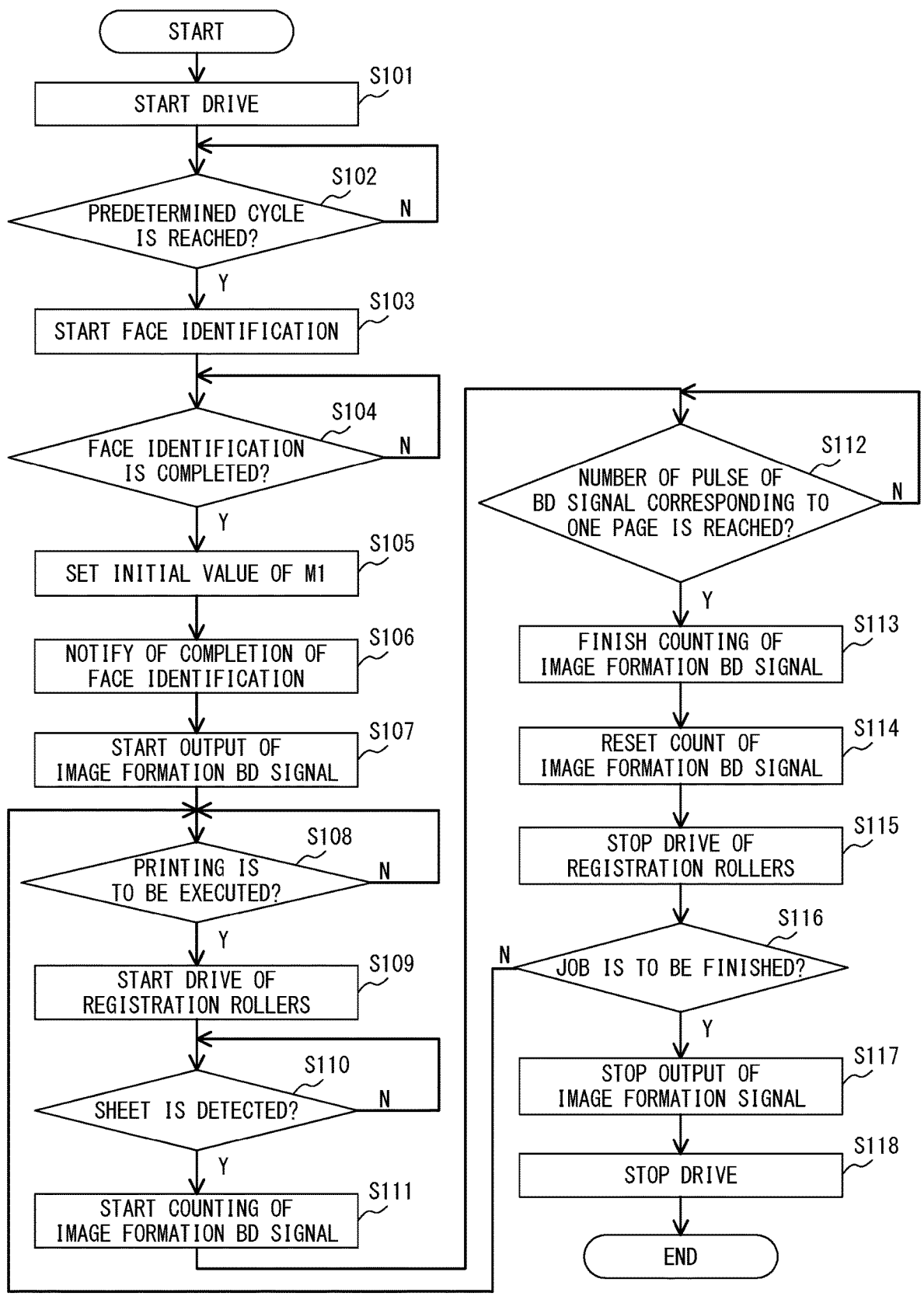
FIG. 6 is a flow chart for illustrating control to be performed by an engine controller.

FIG. 6 is a flow chart for illustrating control to be performed by the engine controller 1009 in this embodiment. In the following description, after the face identification is completed, the engine controller 1009 updates the counted number M1 every time the falling edge of the input BD signal is detected.

When the printing job is started, the engine controller 1009 starts drive of the motor (polygon motor) configured to rotationally drive the polygon mirror 1002 (Step S101). When the rotation cycle of the polygon mirror 1002 has reached the predetermined cycle (Step S102: Y), the engine controller 1009 starts face identification (time t1) (Step S103). Then, when the engine controller 1009 completes the face identification (time t2), the processing proceeds to Step S105 (Step S104: Y).

The engine controller 1009 sets a face number corresponding to a BD signal that is input first after the identification of the face number is finished, as an initial value of the counted number M1 of the face counter 1009d (Step S105). When the initial value is set, the engine controller 1009 updates the counted number M1 every time the falling edge of the input BD signal is detected. The engine controller 1009 notifies the image controller 1007 via the communication I/F 1009e that the face identification is completed (Step S106). The engine controller 1009 starts output of the image formation BD signal (Step S107).

When receiving from the CPU 151 an instruction to form an image on the recording medium (Step S108: Y), the engine controller 1009 starts drive of the registration rollers 723 (Step S109). As a result, the conveyance of the recording medium is started. When the signal indicating detection of the leading edge of the recording medium by the sheet sensor 726 is input to the engine controller 1009 (Step S110: Y), the engine controller 1009 starts counting of the pulse of the output image formation BD signal (Step S111). The engine controller 1009 counts, for example, falling of the pulse of the output image formation BD signal.

When the counted number of pulses has reached the number of pulses corresponding to one page of the recording medium (period Ta) (Step S112: Y), the engine controller 1009 finishes counting of the pulses of the output image formation BD signal (Step S113). The engine controller 1009 then resets the counted number (Step S114). Further, the engine controller 1009 stops drive of the registration rollers 723 (Step S115).

When the printing job is not to be finished, the processing returns to Step S108 again (Step S116: N). When the printing job is to be finished (Step S116: Y), the engine controller 1009 stops output of the image formation BD signal (Step S117), stops driving of the polygon mirror 1002 (Step S118), and ends the processing of the flow chart.

This concludes the control to be performed by the engine controller 1009.

Processing by Image Controller

Next, control to be performed by the image controller 1007 is described. As illustrated in FIG. 3, the image controller 1007 includes the image processor 1010 configured to identify, based on the image formation BD signal received by the receiver 1013, face information for identifying a reflection face on which the laser beam for scanning the light receiving surface of the BD sensor 1004 is deflected, and correct image data based on the face information. In the following, the function of the image processor 1010 is described.

Figure 7:
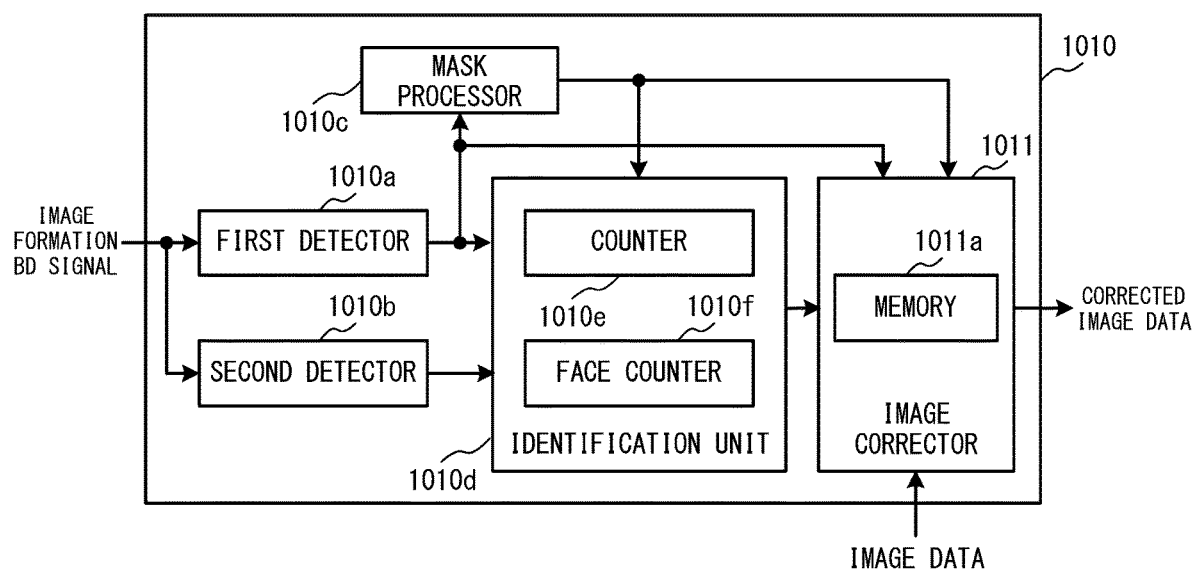
FIG. 7 is a diagram for illustrating a configuration of an image processor.

FIG. 7 is an explanatory diagram of the configuration of the image processor 1010 in this embodiment. As illustrated in FIG. 7, the image processor 1010 includes a first detector 1010a configured to detect the falling edge of the image formation BD signal, and a second detector 1010b configured to detect a voltage level of the image formation BD signal. The image processor 1010 also includes a mask processor 1010c configured to output a mask signal in accordance with a detection result output from the first detector 1010a. The image processor 1010 further includes an identification unit 1010d configured to identify a reflection face on which the laser beam for scanning the light receiving surface of the BD sensor 1004 is deflected. The image processor 1010 further includes an image corrector 1011 configured to correct image data based on information on the reflection face identified by the identification unit 1010d.

When detecting the falling edge of the input image formation BD signal, the first detector 1010a outputs a signal indicating detection of the falling edge to the mask processor 1010c, the identification unit 1010d, and the image corrector 1011. The second detector 1010b samples a voltage level of the input image formation BD signal at predetermined cycles, and outputs a sampling result to the identification unit 1010d.

When the signal indicating detection of the falling edge is output from the first detector 1010a, the mask processor 1010c sets the mask signal to "H (high level)", and outputs the resultant mask signal to the identification unit 1010d and the image corrector 1011. That is, with the output of the signal indicating detection of the falling edge from the first detector 1010a as a start point, the mask processor 1010c sets the mask signal to "H" to output the resultant mask signal. In this embodiment, a time period in which the mask signal is at "H" is set to a time period of a predetermined ratio (for example, 95%) of a shortest cycle from among the scanning cycles T1 to T4 corresponding to the respective face numbers. Further, in this embodiment, when the falling edge caused by reception of the laser beam by the BD sensor 1004 is detected, the mask signal is set to "H", but the present disclosure is not limited thereto. For example, the mask signal may be set to "H" during a predetermined period within a period from when a falling edge of the image formation BD signal is detected until a next falling edge of the image formation BD signal is detected first after the timing of detecting the previous falling edge.

The identification unit 1010d includes a counter 1010e configured to count the sampling result of the image formation BD signal having the low level, which is obtained by the second detector 1010b, and a face counter 1010f configured to store the face information indicating the identified reflection face. A counted number M2 of the face counter 1010f corresponds to the face information.

Figure 8A:
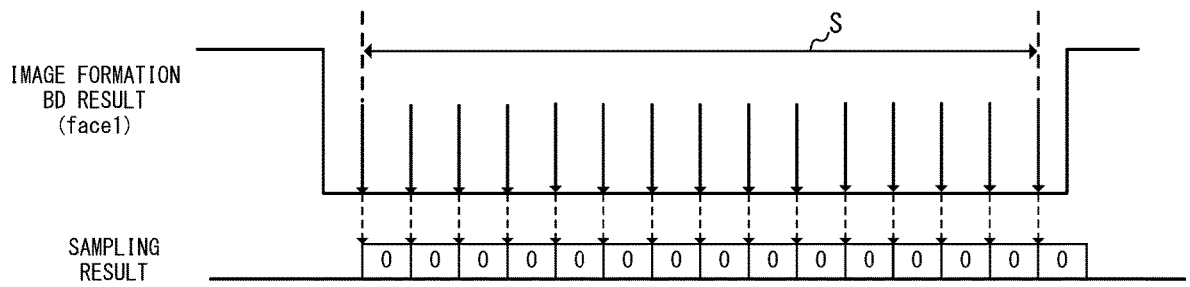
FIG. 8A, FIG. 8B, FIG. 8C, and FIG. 8D are each a diagram for illustrating a relationship between an image formation BD signal and a sampling result.
Figure 8B:
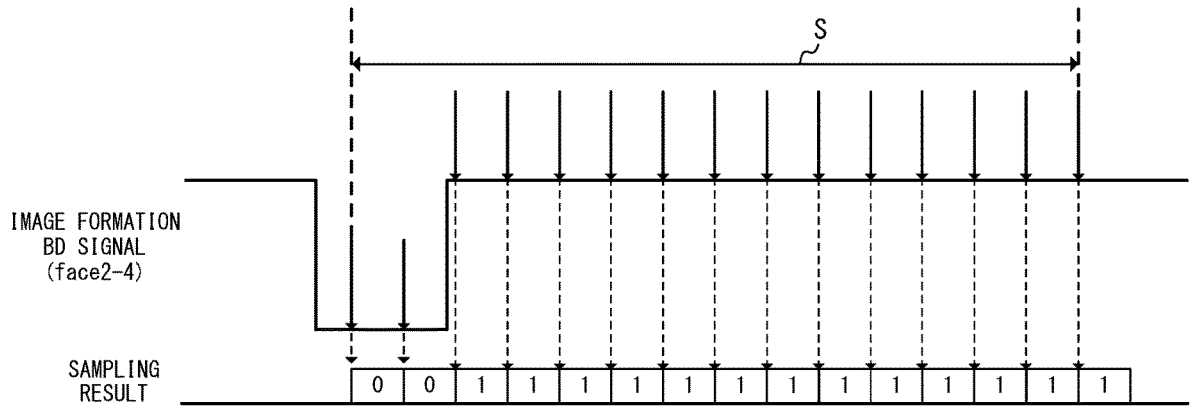
Figure 8C:
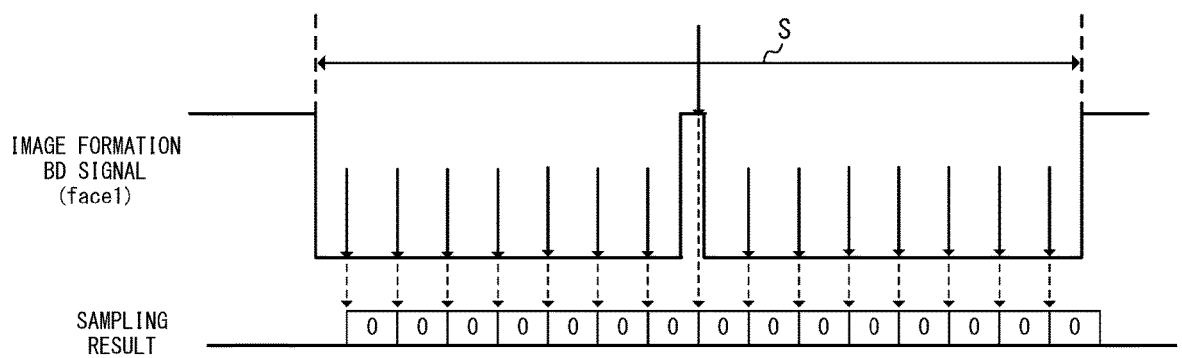
Figure 8D:
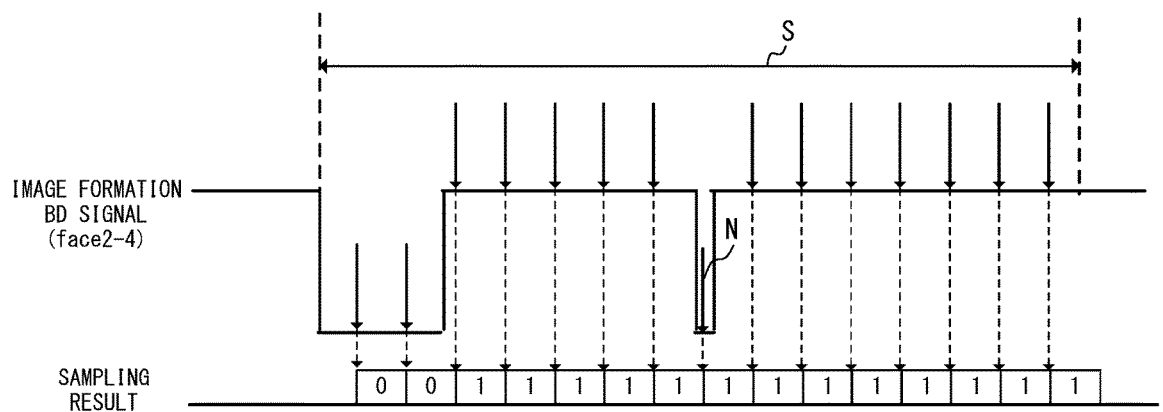

FIG. 8A to FIG. 8D are diagrams for illustrating a relationship between the image formation BD signal and the sampling result. FIG. 8A and FIG. 8B are diagrams for illustrating a relationship between the image formation BD signal and the sampling result in a case where a noise N is not mixed into the image formation BD signal. FIG. 8C and FIG. 8D are diagrams for illustrating a relationship between the image formation BD signal and the sampling result in a case where the noise N is mixed into the image formation BD signal.

As illustrated in FIG. 8A to FIG. 8D, when the signal indicating detection of the falling edge is output from the first detector 1010a, the counter 1010e counts the sampling result for a predetermined time period ("S" in FIG. 8A to FIG. 8D). The predetermined time period is set to a time period equal to or longer than the time period ta of FIG. 5. Further, the predetermined time period is set to a time period shorter than a time interval between adjacent pulses of the image formation BD signal.

The identification unit 1010d identifies the reflection face based on a result of counting by the counter 1010e within the predetermined time period. Specifically, when a counted number C of the low level ("L") obtained by the counter 1010e is larger than a predetermined number Cc, the identification unit 1010d determines that the image formation BD signal input to the image controller 1007 is a signal indicating the face "1". For example, when the number of times that the second detector 1010b can sample the voltage level within the time period ta, in which the image formation BD signal corresponding to the face number "1" is at "L", is represented by "k", the predetermined number Cc is set to K (=k*0.9). Specifically, for example, when it is assumed that the number of times that the second detector 1010b can sample the voltage level within the time period ta is 20, the predetermined number Cc is set to "18". The predetermined number Cc is set to a value larger than the number of times that the second detector 1010b can sample the voltage level within the time period in which the image formation BD signal corresponding to each of the face numbers "2", "3", and "4" is at "L".

With this configuration, even when the image formation BD signal contains noise, the identification unit 1010d can determine with high accuracy a reflection face on which the laser beam is deflected.

When determining that the image formation BD signal input to the image controller 1007 is the signal indicating the face "1", the identification unit 1010d sets the counted number M2 of the face counter 1010f to "1", which is a reference number.

Every time the signal indicating detection of the falling edge is output from the first detector 1010a, the identification unit 1010d updates the counted number M2 of the face counter 1010f. The counted number M2 of the face counter 1010f is output to the image corrector 1011 as the face number. When the polygon mirror 1002 has n (n is a positive integer) reflection faces, M2 is a positive integer satisfying 1≤M2≤n.

During a period in which the mask signal is "H", the identification unit 1010d does not update the counted number M2 of the face counter 1010f even when the signal indicating detection of the falling edge is output from the first detector 1010a. As a result, it is possible to prevent a case in which the counted number M2 differs from the reflection face on which the laser beam is deflected because noise is generated during a time period from detection of the falling edge until detection of a falling edge next to this falling edge.

The image corrector 1011 outputs corrected image data in response to the signal indicating detection of the falling edge being output from the first detector 1010a. During the period in which the mask signal is "H", the image corrector 1011 does not output the image data even when the signal indicating detection of the falling edge is output from the first detector 1010a. As a result, it is possible to prevent a case in which image data is output at timing of falling of the image formation BD signal due to noise.

Figure 9:
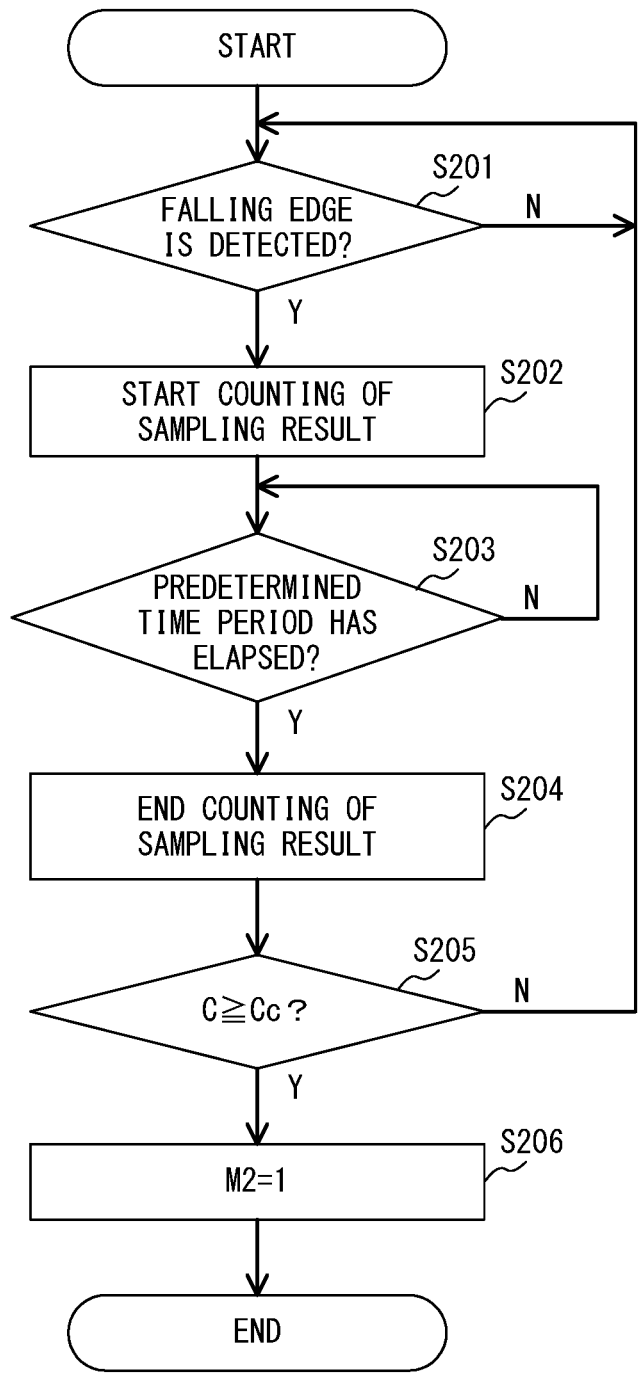
FIG. 9 is a flow chart for illustrating a method of identifying a reflection face.

FIG. 9 a flow chart for illustrating a method of identifying a reflection face by the identification unit 1010d based on the image formation BD signal output from the engine controller 1009. The processing of the flow chart illustrated in FIG. 9 is executed by the CPU 151. During a period in which the processing of the flow chart is performed, the mask processor 1010c sets the mask signal to "H" when the falling edge of the image formation BD signal is detected under a state in which the mask signal is at "L (low level)".

When the signal indicating detection of the falling edge is output from the first detector 1010a (Step S201: Y), the CPU 151 controls the counter 1010e such that the counter 1010e starts counting of the sampling result output from the second detector 1010b (Step S202). As a result, the counter 1010e starts counting of the sampling result. After that, when the predetermined time period has elapsed (Step S203: Y), the CPU 151 controls the counter 1010e such that the counter 1010e ends counting of the sampling result output from the second detector 1010b (Step S204). As a result, the counter 1010e ends counting of the sampling result. Then, when the counted number C obtained by the counter 1010e is smaller than the predetermined number Cc, the processing returns to Step S201 again (Step S205: N).

When the counted number C obtained by the counter 1010e is equal to or larger than the predetermined number Cc (Step S205: Y), the CPU 151 controls the identification unit 1010d such that the identification unit 1010d sets the counted number M2 of the face counter 1010f to "1" (Step S208). As a result, the counted number M2 of the face counter 1010f is set to "1".

Then, the CPU 151 ends the processing of the flow chart.

Timing to Output Image Data

The image processor 1010 outputs corrected image data based on the image formation BD signal input from the engine controller 1009 to the image controller 1007. Specifically, when "y" image formation BD signals (in this embodiment, 10 signals) have been input since the signal indicating detection of the leading edge of the recording medium was output from the sheet sensor 726 (that is, from 11th pulse), the image processor 1010 starts output of the corrected image data. As described above, in this embodiment, when 10 pulses of the image formation BD signal have been output since the sheet sensor 726 detected the leading edge of the recording medium, the corrected image data is started to be output. As a result, the image is formed at a predetermined position of the recording medium.

Correction of Image Data

The image corrector 1011 corrects image data in order from image data A, which is the most upstream piece of image data in the sub-scanning direction from among a plurality of pieces of image data forming the image corresponding to one page described with reference to FIG. 2. Specifically, for example, when an image corresponding to the image data A is formed by the laser beam deflected by the reflection face corresponding to the face number "1", the image corrector 1011 performs correction corresponding to the face number "1" on the image data A. More specifically, the image corrector 1011 reads out from a memory 1011a correction data corresponding to the face number "1". Then, the image corrector 1011 corrects the image data A based on the read correction data. After that, the image corrector 1011 corrects the most upstream piece of image data B from among a plurality of pieces of image data on the downstream side of the image data A in the sub-scanning direction, based on correction data corresponding to the face number "2" stored in the memory 1011a. As described above, in the memory 1011a, the correction data corresponding to each face number is stored in association with the face number. With this configuration, a laser beam based on image data corrected through use of correction data corresponding to a face number "m" (m is a positive integer of from 1 to 4) is deflected by a reflection face corresponding to the face number "m". The image corrector 1011 performs the above-mentioned processing until correction of image data corresponding to one surface of the recording medium is completed.

The image corrector 1011 outputs to the laser controller 1008 the image data that has been corrected in the above-mentioned manner for each region in order from the upstream side (that is, from the image data A). Every time the falling edge of the image formation BD signal is detected (that is, in accordance with the cycle of the image formation BD signal), the image corrector 1011 outputs one piece of image data (image data corresponding to one region) to the laser controller 1008. In this embodiment, the image corrector 1011 corrects the image data and outputs the corrected image data in synchronization with the image formation BD signal, but the present disclosure is not limited thereto. For example, the image corrector 1011 may be configured to correct image data in advance based on the counted number M2, and output the image data corrected in advance to the laser controller 1008 in synchronization with the image formation BD signal.

The image corrector 1011 has built therein a counter (not shown) configured to count the number of pieces of output image data. When the counted number of the counter reaches a value corresponding to one sheet (corresponding to one page) of the recording medium, the image corrector 101 stops output of the image data.

Figure 10:
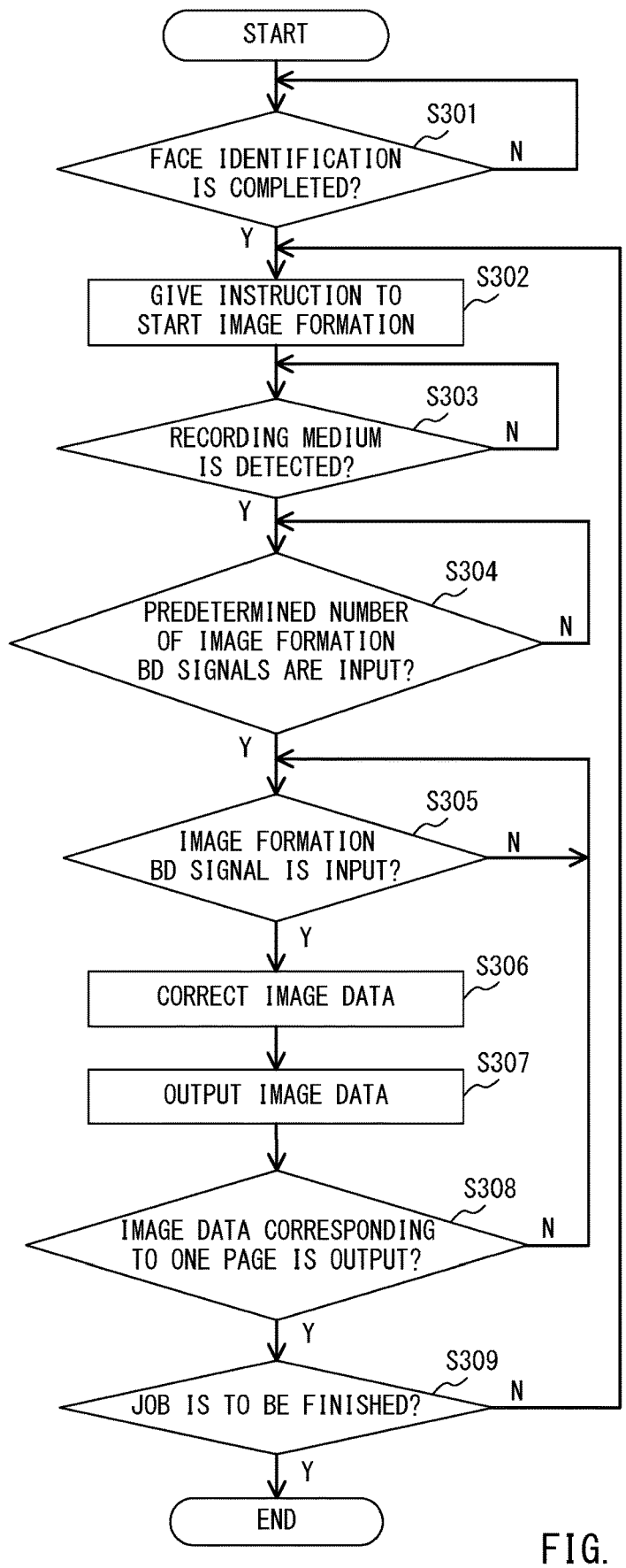
FIG. 10 is a flow chart for illustrating control to be performed by the image controller.

FIG. 10 is a flow chart for illustrating control to be performed by the image controller 1007. The processing of the flow chart illustrated in FIG. 10 is executed by the CPU 151. In the following description, the face number to be output from the face counter 1010f to the image corrector 1011 is updated every time the counted number M2 is updated. Further, during a period in which the processing of the flow chart illustrated in FIG. 10 is executed, the image controller 1007 (image corrector 1011) counts the number of regions of the output image data.

When being notified that the face identification is completed from the engine controller 1009 via the communication I/F 1012 (Step S301: Y), the CPU 151 outputs to the engine controller 1009 an instruction to form an image on the recording medium (Step S302). As a result, the engine controller 1009 starts drive of the registration rollers 723. After that, when the signal indicating that the sheet sensor 726 has detected the leading edge of the recording medium is input to the image controller 1007 (Step S303: Y), the CPU 151 advances the processing to Step S304.

When a predetermined number of image formation BD signals (ten image formation BD signals in this embodiment) have been input (when the falling edge of the image formation BD signal has been detected a predetermined number of times) (Step S304: Y), the processing proceeds to Step S305. When the next image formation BD signal (11th image formation BD signal in this embodiment) has been input (Step S305: Y), the CPU 151 controls the image corrector 1011 such that the image corrector 1011 corrects the image data based on the face number indicated by the counted number M2 (Step S306). As a result, the image corrector 1011 corrects the image data based on the face number indicated by the counted number M2. Then, the CPU 151 controls the image corrector 1011 such that the image corrector 1011 outputs the image data corrected in Step S306 to the laser controller 1008 in synchronization with the image formation BD signal (Step S307). As a result, the corrected image data is output to the laser controller 1008 in synchronization with the image formation BD signal.

The image controller 1007 repeatedly performs the processing of from Step S305 to Step S307 until the image data corresponding to one surface (corresponding to one page) of the recording medium is output (Step S308). Subsequently, the CPU 151 repeatedly performs the processing described above until the printing job is finished (Step S309).

As described above, in this embodiment, the generator 1009d sets the time period in which the image formation BD signal indicating a specific reflection face (face "1" in this embodiment) is at "L" to a time period different from the time period in which the image formation BD signal indicating another reflection face is at "L". The engine controller 1009 outputs the image formation BD signal generated by the generator 1009d to the image controller 1007.

The identification unit 1010d counts the sampling result of the voltage level of the input image formation BD signal, to thereby identify a reflection face on which the laser beam is deflected. Specifically, when the number of sampling results indicating that the voltage level is at "L" within the predetermined time period (counted number) is equal to or larger than the predetermined number Cc, the identification unit 1010d determines that the image formation BD signal is a signal indicating the specific reflection face (first face in this embodiment). As a result, it is possible to prevent the case in which a face is erroneously determined to be a reflection face due to noise generated in the image formation BD signal. That is, a reflection face is determined with high accuracy. As a result, it is possible to prevent image data from being corrected inappropriately.

In this embodiment, the face identification unit 1010d determines a face number based on the time period in which the image formation BD output from the engine controller 1009 signal is at "L", but the present disclosure is not limited thereto. For example, the face identification unit 1010d may determine the face number based on the time period in which the image formation BD signal output from the engine controller 1009 is at "H".

In this embodiment, the engine controller 1009 starts counting of the number of pulses of the output image formation BD signal when the output of the image formation BD signal is started, but the present disclosure is not limited thereto. For example, the engine controller 1009 may be configured to start counting of the number of pulses of the output image formation BD signal when the output of the image data from the image controller 1007 to the laser controller 1008 is started.

The laser light source 1000, the polygon mirror 1002, the photosensitive drum 708, the BD sensor 1004, and the engine controller 1009 in this embodiment are included in an image forming unit.

In this embodiment, the image controller 1007 outputs the corrected image data to the laser controller 1008, but the present disclosure is not limited thereto. For example, the image controller 1007 may be configured to output the corrected image data to the engine controller 1009, and the engine controller 1009 may be configured to output the image data to the laser controller 1008. That is, it is only required that the image controller 1007 be configured to output the corrected image data to the image forming unit.

In this embodiment, the sheet sensor 726 is arranged on the upstream side of the transfer position and on the downstream side of the registration rollers 723, but the present disclosure is not limited thereto. For example, the sheet sensor 726 may be arranged on the upstream side of the registration rollers 723.

In this embodiment, as described above with reference to FIG. 4A, FIG. 4B, and FIG. 5, a face number is identified based on the cycle of the BD signal, but a method of identifying a face number is not limited thereto. For example, a face number may be identified based on a phase difference between a signal indicating the rotation cycle of the motor configured to rotationally drive the polygon mirror 1002 (for example, a signal of an encoder or an FG signal) and the BD signal.

An active period (period of the low level) and sampling period of the image formation BD signal are not limited to the above-mentioned periods, and the number of times of each period is not limited to the above-mentioned number. The sampling period and the number of times of sampling may be increased by increasing the active period of the image formation BD signal. Further, the image controller 1007 may obtain, instead of the image formation BD signal, the BD signal directly from the BD sensor 1004, to thereby perform the processing described above.

In this embodiment, the image controller 1007 determines a face number based on the time period in which the image formation BD signal obtained from the engine controller 1009 is at the low level, but the present disclosure is not limited thereto. For example, the image controller 1007 may determine a face number based on the time period in which the image formation BD signal obtained from the engine controller 1009 is at the high level.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-106823, filed Jun. 4, 2018 which is hereby incorporated by reference herein in its entirety.

What is claimed is:

1. An information processing apparatus which is connected to an image forming apparatus including an image forming unit, the image forming unit comprising:
a first receiver configured to receive image data;
a light source configured to output light based on the image data received by the first receiver;
a photosensitive member;
a rotary polygon mirror, which has a plurality of reflection faces, and which is configured to rotate to deflect the light output from the light source through use of the plurality of reflection faces, to thereby scan the photosensitive member;
a light receiver configured to receive the light deflected by the rotary polygon mirror; and
a first processor, wherein the first processor is configured:
to identify a reflection face that is used for scanning of the photosensitive member from among the plurality of reflection faces; and
to generate a signal having a first level and a second level, the signal being generated based on information about the identified reflection face such that a first length is different from a second length, wherein the first length is a length of a period of the first level corresponding to a specific reflection face from among the plurality of reflection faces and the second length is a length of a period of the first level corresponding to a reflection face other than the specific reflection face, the information processing apparatus comprising:
a second processor, wherein the second processor is configured:
to receive the signal;
to detect a change of a level of the signal from the second level to the first level;
to sample the level of the signal at predetermined time intervals;
to determine, based on a sampling result obtained by the sampling during a predetermined period from a first timing, at which the change is detected, to a second timing, at which a predetermined time has elapsed from the first timing, whether the change at the first timing is a change corresponding to the specific reflection face;
to correct, based on a determination result obtained by the determining, image data corresponding to a scanning line of the light, through use of correction data corresponding to a reflection face corresponding to the scanning line; and to output the corrected image data to the image forming unit, wherein the first length is longer than the second length, and wherein the second processor is configured to determine that the change at the first timing is the change corresponding to the specific reflection face in a case where the number of times of sampling of the signal having the first level during the predetermined period is larger than a predetermined number.

2. The information processing apparatus according to claim 1, wherein the predetermined number includes a number smaller than a number of times that the sampling by the second processor is enabled to perform sampling during a period of the first level corresponding to the specific reflection face.

3. The information processing apparatus according to claim 1, wherein the second processor is configured to output the image data corrected by the second processor to the image forming unit in response to the detection of a change of level of the received signal.

4. The information processing apparatus according to claim 1, wherein the change includes a change of the signal from a high level corresponding to the second level to a low level corresponding to the first level.

5. The information processing apparatus according to claim 1, wherein, after an instruction to form an image on a recording medium is output to the image forming unit, the second processor is configured to start output of the corrected image data to the image forming unit in a case where the change has been detected a predetermined number of times.

6. An information processing apparatus which is connected to an image forming apparatus including an image forming unit, the image forming unit comprising:
a first receiver configured to receive image data;
a light source configured to output light based on the image data received by the first receiver;
a photosensitive member;
a rotary polygon mirror, which has a plurality of reflection faces, and which is configured to rotate to deflect the light output from the light source through use of the plurality of reflection faces, to thereby scan the photosensitive member;
a light receiver configured to receive the light deflected by the rotary polygon mirror; and
a first processor, wherein the first processor is configured:
to identify a reflection face that is used for scanning of the photosensitive member from among the plurality of reflection faces; and
to generate a signal having a first level and a second level, the signal being generated based on information about the identified reflection face such that a first length is different from a second length, wherein the first length is a length of a period of the first level corresponding to a specific reflection face from among the plurality of reflection faces and the second length is a length of a period of the first level corresponding to a reflection face other than the specific reflection face, the information processing apparatus comprising:
a second processor, wherein the second processor is configured:
to receive the signal;
to detect a change of a level of the signal from the first level to the second level;
to sample the level of the signal at predetermined time intervals;
to determine, based on a sampling result obtained by the sampling during a predetermined period from a first timing, at which the change is detected, to a second timing, at which a predetermined time has elapsed from the first timing, whether the change is a change corresponding to the specific reflection face;
to correct, based on a determination result obtained by the determining, image data corresponding to a scanning line of the light, through use of correction data corresponding to one of the plurality of reflection faces corresponding to the scanning line; and
to output the corrected image data to the image forming unit, wherein the first length is longer than the second length, and wherein the second processor is configured to determine that the change at the first timing is the change corresponding to the specific reflection face in a case where the number of times of sampling of the signal having the first level during the predetermined period is larger than a predetermined number.

7. An image forming apparatus including a generator which generates image data and an image forming unit which forms an image on a recording medium based on the image data output from the generator, the image forming unit comprising:
a first receiver configured to receive image data;
a light source configured to output light based on the image data received by the first receiver;
a photosensitive member;
a rotary polygon mirror, which has a plurality of reflection faces, and which is configured to rotate to deflect the light output from the light source through use of the plurality of reflection faces, to thereby scan the photosensitive member;
a light receiver configured to receive the light deflected by the rotary polygon mirror; and
a first processor, wherein the first processor is configured:
to generate a signal having a first level and a second level, the signal being generated based on information about the identified reflection face such that a first length is different from a second length, wherein the first length is a length of a period of the first level corresponding to a specific reflection face from among the plurality of reflection faces and the second length is a length of a period of the first level corresponding to a reflection face other than the specific reflection face, the generator comprising:
a second processor, wherein the second processor is configured:
to receive the signal;
to detect a change of a level of the signal received by the second receiver from the second level to the first level;
to sample the level of the signal at predetermined time intervals;
to determine, based on a sampling result obtained by the second detector during a first period from a first timing, at which the change is detected by the first detector, to a second timing, at which the change is detected first by the first detector after the first timing, whether the change is a change corresponding to the specific reflection face;
to correct, based on a determination result obtained by the determiner, image data corresponding to a scanning line of the light, through use of correction data corresponding to a reflection face corresponding to the scanning line; and
to output the corrected image data to the image forming unit,
wherein the first length is longer than the second length, and
wherein the second processor is configured to determine that the change at the first timing is the change corresponding to the specific reflection face in a case where the number of times of sampling of the signal having the first level during the predetermined period is larger than a predetermined number.

8. An image forming apparatus including a generator which generates image data and an image forming unit which forms an image on a recording medium based on the image data output from the generator,
the image forming unit comprising:
a first receiver configured to receive image data;
a light source configured to output light based on the image data received by the first receiver;
a photosensitive member;
a rotary polygon mirror, which has a plurality of reflection faces, and which is configured to rotate to deflect the light output from the light source through use of the plurality of reflection faces, to thereby scan the photosensitive member;
a light receiver configured to receive the light deflected by the rotary polygon mirror; and
a first processor, wherein the first processor is configured:
to generate a signal having a first level and a second level, the signal being generated based on information about the identified reflection face such that a first length is different from a second length, wherein the first length is a length of a period of the first level corresponding to a specific reflection face from among the plurality of reflection faces and the second length is a length of a period of the first level corresponding to a reflection face other than the specific reflection face,
the generator comprising:
a second processor, wherein the second processor is configured:
to receive the signal;
to detect a change of a level of the signal received by the second receiver from the first level to the second level;
to sample the level of the signal at predetermined time intervals;
to determine, based on a sampling result obtained by the second detector during a first period from a first timing, at which the change is detected by the first detector, to a second timing, at which the change is detected first by the first detector after the first timing, whether the change is a change corresponding to the specific reflection face;
to correct, based on a determination result obtained by the determiner, image data corresponding to a scanning line of the light, through use of correction data corresponding to a reflection face corresponding to the scanning line; and
to output the corrected image data to the image forming unit,
wherein the first length is longer than the second length, and
wherein the second processor is configured to determine that the change at the first timing is the change corresponding to the specific reflection face in a case where the number of times of sampling of the signal having the first level during the predetermined period is larger than a predetermined number.

* * * * *